W. G. MOORE.
STEERING HEAD HUB FOR TWO WHEELED AUTOVEHICLES.
APPLICATION FILED DEC. 28, 1917.
1,266,612.
Patented May 21, 1918.
2 SHEETS—SHEET 1.
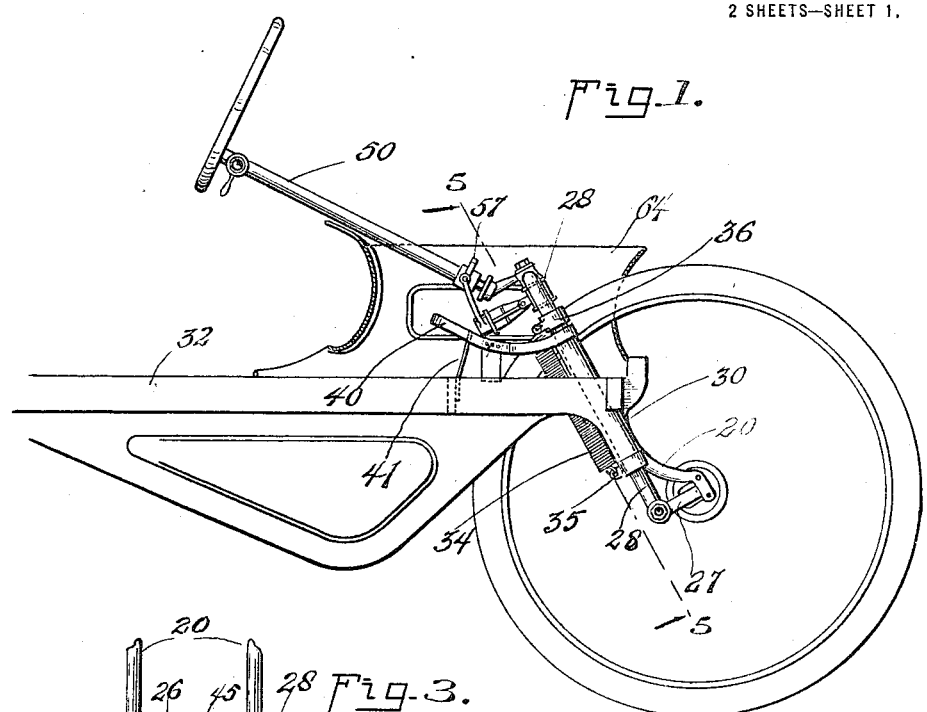
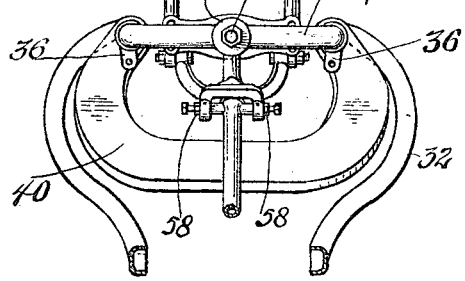
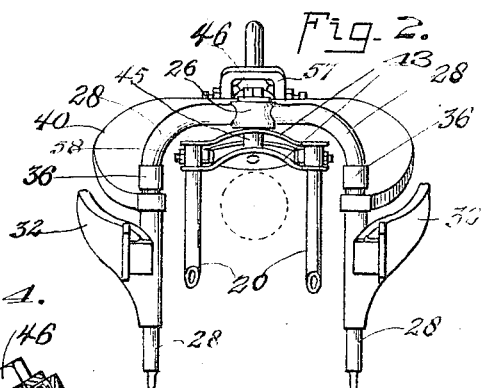
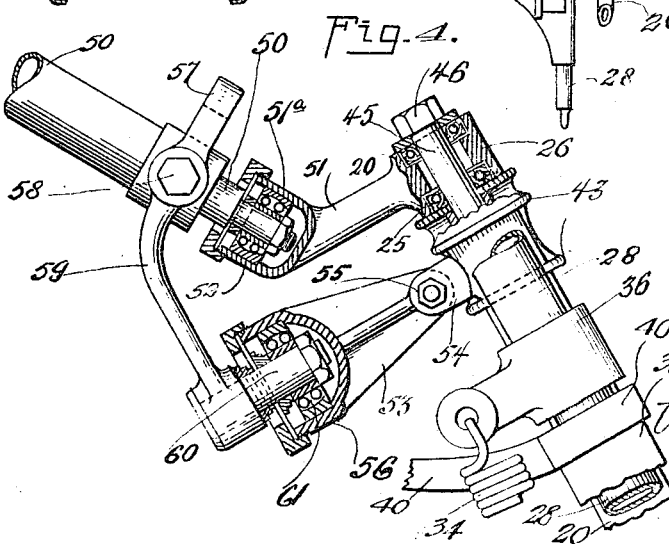
INVENTOR
Wm. G. Moore
BY
Eugene C. Brown
ATTORNEY

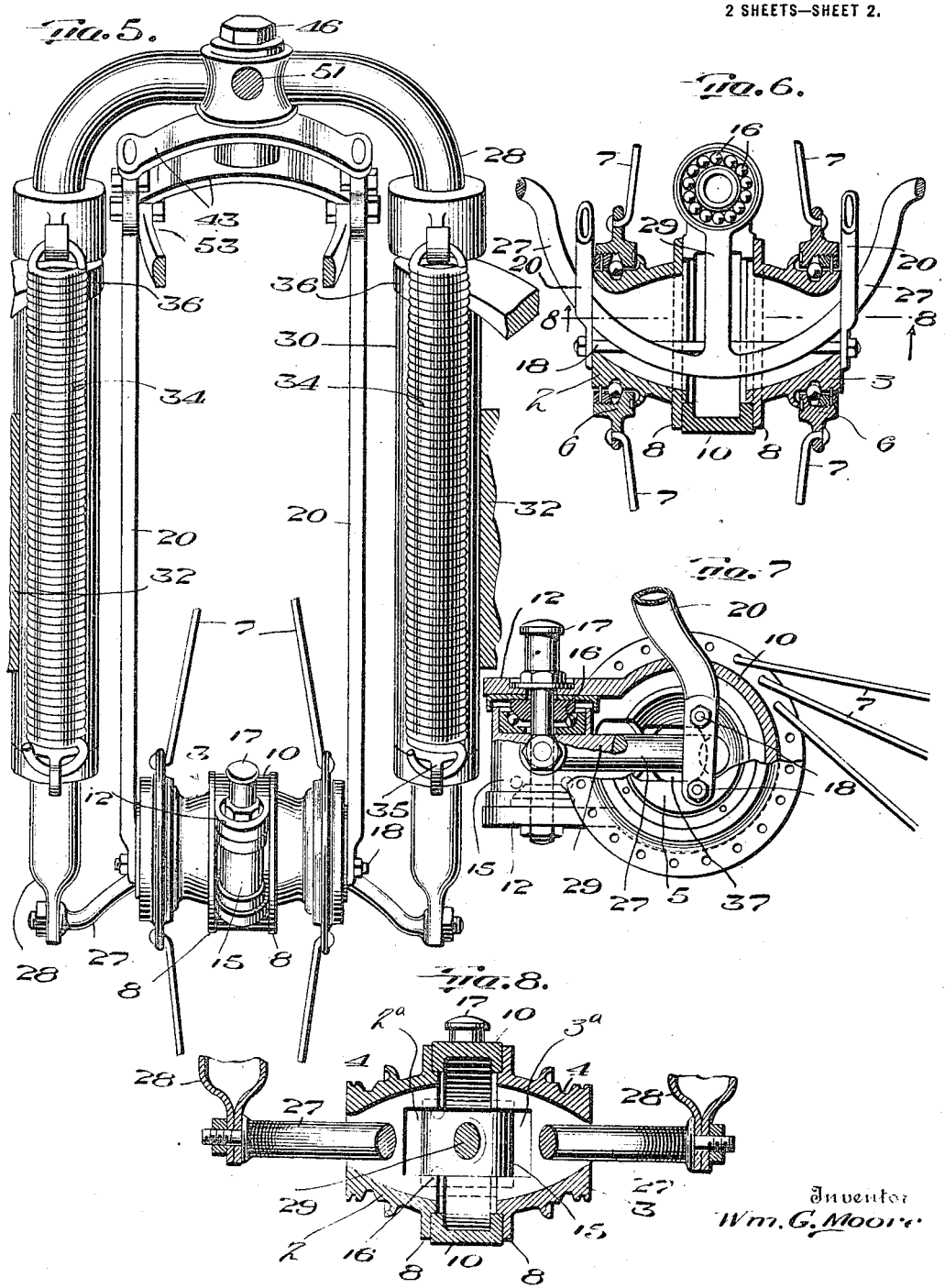

UNITED STATES PATENT OFFICE.

WILLIAM G. MOORE, OF INDIANAPOLIS, INDIANA.

STEERING-HEAD HUB FOR TWO-WHEELED AUTOVEHICLES.

1,266,612.

Specification of Letters Patent.  Patented May 21, 1918.

Continuation of application Serial No. 150,098, filed February 21, 1917. This application filed December 28, 1917. Serial No. 209,378.

*To all whom it may concern:*

Be it known that I, WILLIAM G. MOORE, a citizen of the United States, residing at Indianapolis, in the county of Marion and State of Indiana, have invented certain new and useful Improvements in Steering-Head Hubs for Two-Wheeled Autovehicles, of which the following is a specification.

My invention relates to two wheeled autovehicles in which the front, or steering wheel, is turned or oscillated either to the right or left on an inclined axis to guide the machine or to maintain its equilibrium. This case is a continuation of my application, Serial No. 150,098, filed Feb. 21, 1917.

The main objects of my invention are to relieve the forks and bearings of the steering mechanism of the strains which are incident to the usual type of steering head and floating fork and which constitute the weakest part of the present commercial motorcycles and bicycles; to provide a more sensitive and more easily operated steering mechanism than can be secured by the usual short head and long floating forks employed in the present commercial machines; to increase the rigidity and strength of the steering head; together with other features which will be hereinafter set forth.

I attain these several objects by the mechanism illustrated in the accompanying drawings, in which:—Figure 1 is a side elevation of the forward portion of a vehicle showing a steering mechanism and hub construction embodying my invention; Figs. 2 and 3 are respectively, a front elevation and a top plan view of the upper portion of the steering head; and Fig. 4 is a side elevation, partly in section, of the upper portion of the steering head; Fig. 5 is a vertical section on the line 5—5 of Fig. 1; Fig. 6 is a horizontal section through the axle; Fig. 7 is a side elevation partly in section, of the axle and attached lower steering head bearing; and Fig. 8 is a vertical section on the line 8—8 of Fig. 6.

As is well known the front steering wheel in bicycles and motorcycles is carried some distance ahead of the inclined axis of the steering oscillations for the purpose of securing nearly automatic control and the floating fork which carries the steering wheel is mounted in bearings in the steering head which are so far removed from the tractive effort that the shocks and vibrations from the road surface are transmitted to the bearings in the head with considerable leverage and this feature constitutes the weakest part of the structure and is a constant menace to the rider. I may overcome this defect in prior constructions, while retaining all of the advantages due to the present arrangement of the steering mechanism, by providing a steering head which extends the full length of the forks, having one bearing at the upper extremity and another bearing within the wheel itself, at a distance back of the center of the tractive rotations of the steering wheel.

Referring first to the wheel hub and axle construction, the main axle barrow comprises complementary parts 2, 3 which are provided with external race ways 4 for the ball bearings of the wheel hubs 6 to which the spokes 7 are attached in the usual manner. The hub members 2, 3 are provided with annular flanges 8 which are adapted to fit upon either side of a central hub extension member 10 having its ends extended to form parallel plates 12 between which the lower steering head bearing 15 having ball races 16 is clamped by means of bolt 17. The hub barrow members 2, 3 are rigidly secured against the central hub extension member 10 by means of bolts 18 which pass through the hub and the lower ends of the forks 20.

The upper steering head bearings 25 are carried by the crown member 26 of the reciprocatory yoke frame 28 which is secured at its lower ends to the extremities of the trunnion yoke member 27 which passes through the axle hub and is provided at its center with a rearwardly extending arm 29 integral with the lower steering head bearing 15. The arm 29 is the required length to bring the bearing member 15 a distance in the rear of the wheel axle hub in alinement with the upper steering head bearing, the upper and lower bearings being thus on the same rotative axis. The yoke frame 28 is slidable through guide sleeves 30 which are integral with the side frames 32 of the vehicles, the frame being resiliently supported by means of helical springs 34 which are attached at their lower ends to lugs 35 secured to the sleeves 30, and at their upper ends to lugs carried by clamping rings 36 secured to the arms 28 of the yoke frame. This arrangement permits the wheel forks 20 and yoke frame 28 to vibrate independently of the machine frame 32, such vibrations due to shocks received by the wheel being absorbed by the springs 34. In order to permit the wheel forks to oscillate or turn within the yoke frame 28, the ends of the hub barrow and also the cap plates 5 covering the ends of the hub are provided with elongated openings 37 for the passage of the trunnion yoke 27, and the rear side of the hub barrow members 2, 3 are provided with slots 2ª, 3ª to permit the lateral movement of the arm 29. For the purpose of greatly strengthening the yoke frame 28 and increasing its rigidity, I connect the yoke arms by means of a yoke plate 40 which may be connected to the machine frame by a brace 41.

The steering forks 20 are of the usual type, curving forwardly at their lower ends, and are crowned with crown plates 43 which are pierced and attached to the usual upwardly extending tubular stem 45, held in place by the nut 46 and rotatable in the steering head 26 in the crown of the yoke frame 28.

In order to secure a very strong support for the steering post 50 which is necessarily inclined at an angle to the steering forks and to provide an exceedingly sensitive steering mechanism which shall be absolutely free from any cramping or binding action I connect the steering post 50 with the steering forks 20 and the yoke frame 28 by means of yoke links with interposed ball bearings. A rigid arm or bracket 51 integral with the bearing sleeve 26 on the upper end of the yoke frame, projects rearwardly and terminates in a cup 51ª forming a housing for the ball bearing 52 for the lower end of the steering stem 50. A yoke member 53 pivotally secured at either end to lugs 54 secured to the upper ends of the fork arms 20, carries at its center a cup 56. A yoke member or strap 57 passes over the upper side of the steering post 50 to which it is trunnioned at either side by the pivot bolts 58 and merges together below the post 50 into a single arm 59 which is bent at an angle thereto and carries at its lower end a pin 60 which is rotatably secured in the bearing 61 carried by the cup 56. When the steering post 50 is turned to the right or left in the stationary bearing 52, the arm 59 constituting a steering link will be swung to one side or the other, carrying with it the steering yoke 53, which turns the steering forks 20 in the corresponding direction. It will be observed that in order to permit this movement, the yoke strap 57 and the attached arm 59 oscillate on the trunnion 58, the pin 60 turns in the bearing 61 and the steering yoke 53 oscillates slightly upon the pivot bolts 55 in the lugs 54, but these movements are not attended by any cramping or binding between any of the parts. Moreover, it will be observed that in all positions the steering post 50 is firmly supported by the stationary arm 51 and braced against lateral movement by the arm 59 and guiding yoke 53. The large leverage obtained through the arm 59 and guiding yoke 53 results in a very sensitive steering, since a slight torsional or rotative movement of the steering post produces a much increased movement of the steering forks. The upper part of the steering mechanism may be inclosed in a sheet metal housing 64 if desired.

The operation of the steering mechanism and the results which I have attained by providing a steering head which extends the full length of the forks with a bearing at each extremity, while maintaining all of the advantages of the automatic control of the steering wheel, resulting from having the center of tractive rotations of the wheel forward of the axis of steering oscillations will be appreciated by engineers and those familiar with bicycle and motorcycle constructions. The shocks received by the wheel from obstructions in the roadway are transmitted to the bearing in the steering head of the ordinary machine with a long leverage equal to the distance between the steering head bearing and the wheel axle which, as I previously stated, is a source of weakness in present commercial machines. My invention overcomes this defect by providing a lower steering head bearing directly in the rear of the axle hub and within the wheel. The shocks received by the wheel are transmitted by the steering forks 20 to the upper steering head bearing, but as this bearing is directly connected through the yoke frame 28 and the trunnion yoke 27 with the lower bearing 10, the latter being connected with the wheel axle barrow through the axle extension 10, it will be seen that the shocks are simultaneously received and distributed to both upper and lower steering stem bearings. This construction, therefore, provides a true steering head with upper and lower bearings and extending the full length of the steering forks, thereby overcoming the leverage with which the shocks were transmitted in prior constructions. The steering wheel, forks, and yoke frame vibrate or oscillate as an entirety within the sleeves 30 of the frame, the shocks and vibrations being absorbed by the springs 34, and the frame of the machine is thereby protected from these vibrations.

I have described in detail the particular construction illustrated in the accompanying drawing for the purpose of clearly disclosing an embodiment of my invention, but it will be apparent to engineers and those particularly skilled in this art that various changes and modifications may be made within the scope of my claims and without in any manner departing from the spirit of my invention.

I claim:—

1. In a vehicle, the combination with the frame of the vehicle body, of sleeve members secured at the forward end thereof, a yoke frame slidably mounted in said sleeves and carrying an upper steering-head bearing, springs connecting said yoke frame and said sleeves, a steering fork having an upwardly extending post journaled in said bearing, a wheel having a tubular axle formed of oppositely arranged separable parts provided with axial and lateral openings, means for securing said parts together and to said forks, an extension projecting rearwardly from said axle in alinement with said lateral opening and carrying a lower steering-head bearing, and a curved bearing yoke or trunnion yoke passing through said axial opening and secured to the lower ends of said yoke frame, said trunnion yoke having a central rearwardly extending arm passing through said lateral opening and carrying a bearing support journaled in said lower steering-head bearing.

2. In a vehicle, the combination with the frame of the vehicle body, of sleeve members secured at the forward end thereof, a yoke frame slidably mounted therein and provided with an upwardly extending tubular part carrying the upper steering-head bearing, a steering wheel fork having an upwardly extending post journaled in the bearing in said tubular part, an arm or bracket extending rearwardly from said tubular part and carrying a steering-post bearing, a yoke member pivoted at its ends to the arms of said steering fork, and carrying a bearing centrally thereof, a steering post having its lower end journaled in said steering post bearing, and a link member carrying a pivot pin at its lower end journaled in the bearing in said yoke member and its upper end pivotally connected to said steering post.

3. In a vehicle, the combination with the frame of the vehicle body, of sleeve members secured at the forward end thereof, a yoke frame slidably mounted therein and provided with an upwardly extending tubular part carrying the upper steering-head bearing, a steering wheel fork having an upwardly extending post journaled in the bearing in said tubular part, an arm or bracket extending rearwardly from said tubular part and carrying a steering-post bearing, a yoke member pivoted at its ends to the arms of said steering fork, and carrying a bearing centrally thereof, a steering post having its lower end journaled in said steering-post bearings, and a link member journaled at its lower end in the bearing in said yoke member and at its upper end having portions extending upon opposite sides of said steering post and pivoted thereto.

4. In a vehicle, the combination with the steering head, of a steering wheel fork journaled therein, a steering post bearing connected to said steering head, a rearwardly extending member pivotally connected to the wheel fork and carrying a bearing, a steering post having its lower end journaled in said steering post bearing, and a link device having its lower end journaled in the bearing in said member and its upper part pivotally connected to said steering post.

5. In a vehicle, the combination with the frame of the vehicle body, of sleeve members secured at the forward end thereof, a yoke frame having its arms slidably mounted in said sleeves and provided with an upwardly extending tubular housing for a steering head bearing, resilient means connecting said yoke frame and said sleeves, a yoke brace member connecting said yoke arms, a steering wheel fork having an upwardly extending post journaled in said bearing, an arm or bracket extending rearwardly from said housing and carrying a steering post bearing, a yoke having its arms pivotally connected to the steering fork, a steering post having its lower end journaled in said steering post bearing, and a steering link pivoted to said steering post and having its lower end journaled in a bearing carried by said pivoted yoke.

6. An axle for a vehicle wheel, comprising a central annular member and oppositely arranged bearing members provided with external ball races for the wheel hubs, said bearing members having axial openings and a rearward lateral opening, and said annular member having rearward parallel extensions forming a housing for a steering head bearing, and bolts extending through said annular and bearing members to clamp them together.

7. In a vehicle, the combination of a yoke frame connected to the vehicle body and carrying an upper steering-head bearing, a steering fork, a wheel axle having a central annular member provided with rearwardly extending portions adapted to support a lower steering-head bearing, and oppositely arranged bearing members provided with external ball races for a wheel hub, said axle members having axial openings and a rearward lateral opening between the extensions of said annulus, a curved bar member extending through said axial openings and connecting the lower ends of said yoke frame, said bar having a rearward extension passing through said lateral opening and carrying a bearing member journaled in said lower steering head bearing and fastening means securing together said axle members and the lower ends of said fork.

In testimony whereof I affix my signature.

WILLIAM G. MOORE.